F. P. FRANCIS.
MUD GUARD FOR AUTOMOBILES.
APPLICATION FILED OCT 10, 1921.

1,412,306.

Patented Apr. 11, 1922.

Inventor.
FRANKLIN P. FRANCIS.

Attorneys.

UNITED STATES PATENT OFFICE.

FRANKLIN P. FRANCIS, OF ORLAND, CALIFORNIA.

MUD GUARD FOR AUTOMOBILES.

1,412,306.  Specification of Letters Patent.  Patented Apr. 11, 1922.

Application filed October 10, 1921. Serial No. 506,789.

*To all whom it may concern:*

Be it known that I, FRANKLIN P. FRANCIS, a citizen of the United States, and a resident of Orland, county of Glenn, and State of California, have invented a new and useful Mud Guard for Automobiles, of which the following is a specification.

The present invention relates to improvements in mud guards for automobiles and more particularly provides means for protecting the front end of the automobile. In most present day automobiles the front end of the machine is unprotected altogether so that mud and dust thrown forward by the rapidly rotating wheels frequently splash against the lamps as well as against the front end of the radiator, thereby rendering the lamps unsightly and preventing the lights from properly illuminating the road, and also filling the air spaces of the radiator whereby free circulation of air through the same is prevented. A further object of my invention is to provide a mud guard which at the same time will force part of the air which now ordinarily passes underneath the automobile through the air spaces in the radiator, whereby the same is cooled more effectively and whereby one of the main objectionable features of one well-known type of automobiles is overcome.

Figure 1:
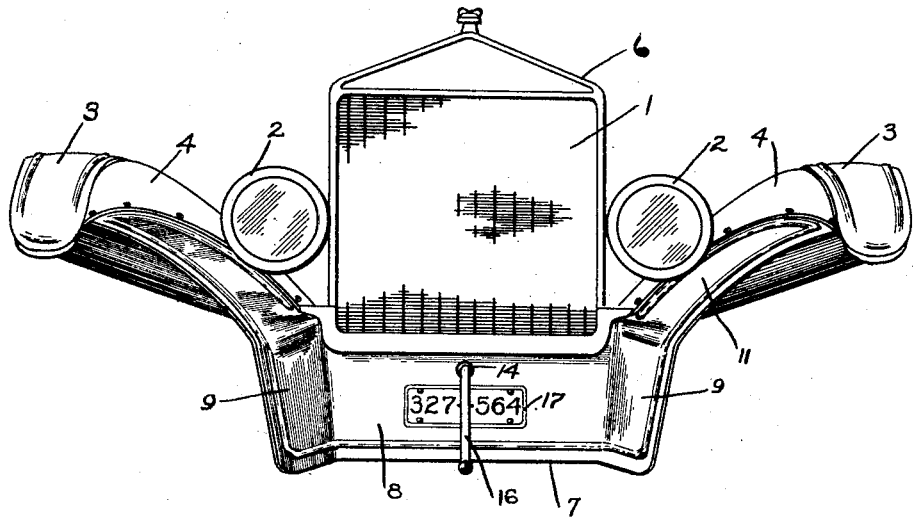
Figure 2:
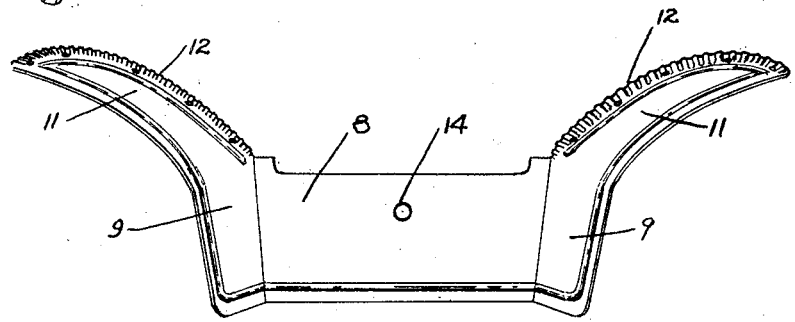

The preferred form of my invention is illustrated in the accompanying drawing in which Figure 1 represents a front view of my mud guard as attached to the front of an automobile; Figure 2 a front view of the detached mud guard, and Figure 3 a plan view of the same.

Figure 3:
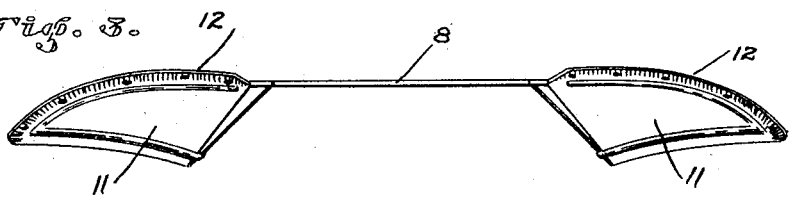

The radiator (1), the lamps (2), the fenders (3) and the mud guards (4) extending between the fenders and the radiator are substantially the only portions of the automobile (6) shown in connection with my attachment. The latter comprises the front mud guard (7) and consists of a vertical plate (8) from the two sides of which extend two flanges or wings (9). The latter slant forwardly and are provided with flaps (11) extending upwardly and outwardly from their upper ends. The rear edges (12) of these flaps engage the front ends of the mud guards (4) usually provided in the present day car between the fenders (3) and the body of the automobile. It will be noticed that the marginal edges (12) are crimped as shown in Figures 2 and 3 which makes it possible to secure them to the side mud guards without causing any rattling, and that a longitudinal corrugation (15) runs parallel to the edges of the wing flaps and the flanges and to the lower edge of the body portion of the plate so as to reinforce the same. A perforation (14) is provided in the plate (8) adapted to allow the crank (16) to pass through. The license plate (17) may be secured to the front of the mud guard as shown in Figure 1.

It will be seen that when this mud guard is attached to the respective front ends of the side mud guards it will cover the front portion of the automobile underneath the radiator, and will at the same time prevent any mud from being thrown against the lamps or the radiator. A further advantage will be that the air which in most present day automobiles can pass freely underneath the radiator will be deflected by the plate (8) and will be forced through the spaces in the radiator thereby providing a further cooling effect. It also gives further strength to the fender support, does not in any way interfere with the oiling or greasing of the car or with any shock absorbers that may be attached to the car and at the same time improves the looks of the same.

I claim:

Means for securing a mud guard consisting of a metal plate presenting on either side a forwardly extending flange having an upwardly extending wing flap to the fenders of a motor vehicle so as to prevent rattling, comprising a longitudinal corrugation running parallel and in close proximity to the edges of the wing flaps and the flanges and the lower edge of the body of the plate for strengthening the mud guard, transverse corrugations extending between said longitudinal corrugation and the upper edges of the wing flaps and means for joining the corrugated edges to the fenders of the automobile, whereby the mud guard is prevented from working loose and forms a fortifying connection between the fenders.

FRANKLIN P. FRANCIS.